Figure 1:
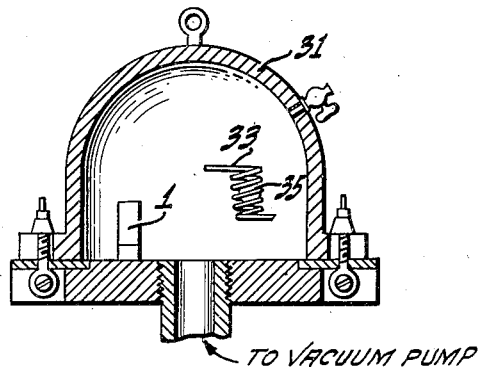

March 8, 1949.　　　C. L. SCHEER ET AL　　　2,464,157

MOLD

Filed June 28, 1944

TO VACUUM PUMP

Inventors
CHARLES L. SCHEER
& WILLIS FLEISHER, JR.

By　CD Nuska
　　　Attorney

Patented Mar. 8, 1949

2,464,157

UNITED STATES PATENT OFFICE 2,464,157

MOLD

Charles L. Scheer, Haddonfield, N. J., and Willis Fleisher, Jr., Elkins Park, Pa., assignors to Radio Corporation of America, a corporation of Delaware Application June 28, 1944, Serial No. 542,482

3 Claims. (Cl. 18—47)

This invention relates to the art of molding or casting plastic materials of the type which shrink as they congeal from their plastic or fluid state to the normally solid form. While not limited thereto, the invention will be described as applied to the casting of such materials for use as insulating embedments for electrical units such, for example, as capacitors, radio coils, transformers, resistors or the like.

Among the materials heretofore used as insulating embedments are certain mineral waxes, (e. g. paraffin), vegetable oils (e. g. hydrogenated castor oil), waxes (e. g. cerese, carnauba) and synthetic resins (e. g. esters of acrylic and alkacrylic acids, polystyrene, etc.). These and numerous other insulating materials adhere to the surface of the mold cavity and, at the same time, shrink in volume as they congeal from their plastic or liquid state to their ultimate solid form. This, usually, gives rise to bubbles and other voids within the embedment. Such voids may contain small quantities of moisture or gas which, when ionized during the operation of the embedded device, provides a leakage path of low electrical resistance through the unit and shortens its life.

Accordingly, the principal object of the present invention is to provide an improved, molded, cast or potted structure and one free from bubbles, cracks and other imperfections.

Another and important object of the invention is to provide an improved method of casting, molding or potting plastic materials of the general character described, and one which may be practiced with a mold or matrix of standard form and dimensions.

Another and related object of the invention is to provide a simple, inexpensive and trouble-free method of treating a metal matrix or mold to facilitate the removal therefrom of the object formed therein.

Still another object of the present invention is to provide a novel and reliable method of applying a metallic coating to the surface or surfaces of a molded object during the molding operation.

The foregoing and other objects are achieved in accordance with the invention by providing the cavity of the mold or matrix with a weakly adherent metallic lining, the strength of adhesion of the lining to the walls of the cavity being less than the strength of adhesion of the molding material to the lining. Thus, when the molding material shrinks as it congeals from its plastic state to its solid form, the lining is stripped (without the use of any auxiliary mechanical force) from the walls of the cavity and adheres tightly to the adjacent surface of the said material, which is thereby prevented from being "torn apart" as it shrinks. Thus, the method of the invention provides a molded or cast object having an adherent metallic coating on the outer surface thereof. This coating is free from imperfections and, if desired, may be allowed to remain on the object either for utilitarian or decorative purposes. However, when necessary or desirable, the metallic lining or coating which adheres to the casting may subsequently be removed by immersing it in a solvent to which the molding material per se is immune.

Figure 2:
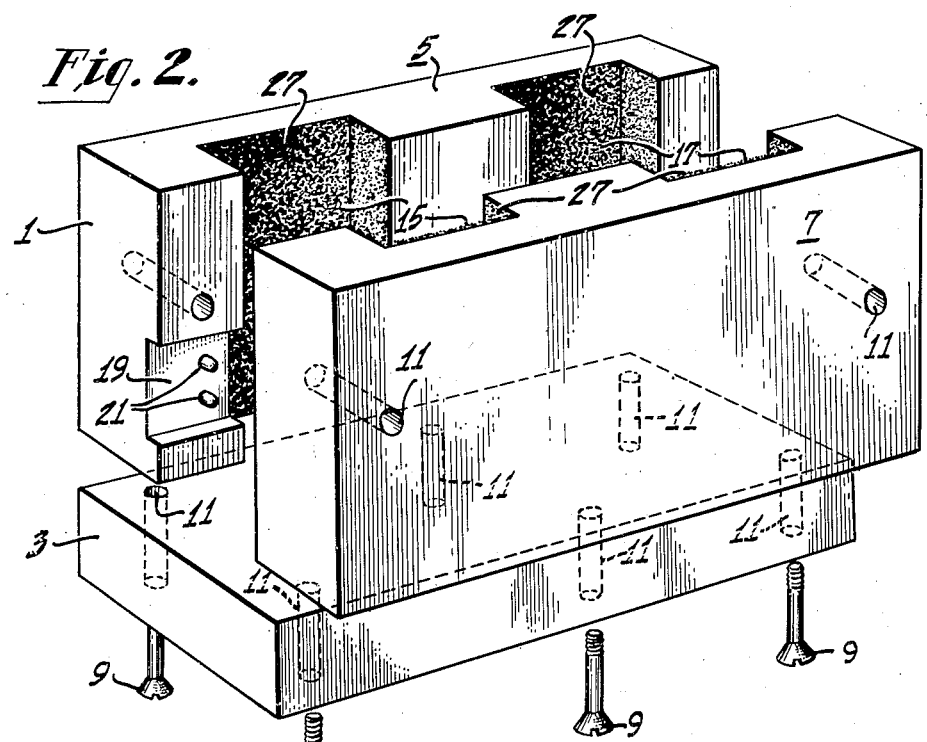
Figure 3:
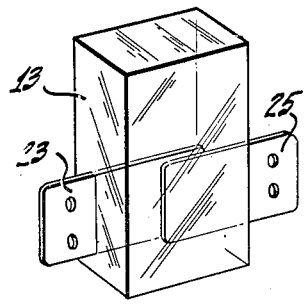

Other objects and advantages together with certain preferred details of construction and procedure will be apparent, and the invention itself will be best understood by a reference to the following specification and to the accompanying drawing, wherein:

Figure 1 shows, in sectional elevation, one form of an apparatus which may be used in applying a film-like metal lining to a mold, in accordance with the invention, Figure 2 is a partly broken away exploded view, in perspective, of a mold of standard form and dimensions having a weakly adherent metallic lining on the cavity-surfaces thereof, and Figure 3 is a molded capacitor constructed in accordance with the principle and method of the invention.

In the drawing, wherein like reference characters designate the same parts in all figures, I designates generally a more or less conventional open-top mold comprising a base 3 and two upstanding side walls or plates 5 and 7 which are adapted to be joined in juxtaposition on the base 3, as by means of screws 9 which are received in suitably tapped holes 11 with which the said separable parts are provided.

The mold which has been selected for purposes of illustration is designed for the manufacture of pairs of molded capacitors similar to the one shown at 13, Figure 3 and, to this end, is provided with two cavities 15 and 17 and with a number of paired horizontal slots 19 and pins 21 for supporting the armatures 23 and 25 of the said capacitors during the embedment operation.

In carrying the invention into effect, the side walls and, preferably, the base of each cavity are provided with a thin lining or coating 27 constituted of metal (e. g. silver), in a finely divided state. As previously pointed out, it is important that the strength of adhesion of the lining 27 to the walls of the cavity or cavities 15 and 17 be less than the strength of adhesion of the molding material to the lining, and the invention may be said to reside, in part, in the provision of such a weakly adherent lining, and one which, unlike a discrete foil lining, can be easily removed from the casting by washing it in a suitable solvent. In this connection it may be mentioned that an entirely satisfactory lining for the mold cannot ordinarily be achieved by the conventional Rochelle salts method or by the Brasheer method. Linings applied to a mold by chemical deposition methods and by spraying also proved unsatisfactory, either because of difficulties in achieving a lining of uniform thickness or because they adhered too tightly to the metal walls of the cavity.

It has been found that a metal coating having the required low strength of adhesion can be applied to the interior surfaces of a mold or matrix by thermal evaporation of a pellet of silver or other metal (e. g. copper, iron or aluminum), in vacuo. In the usual thermal evaporation method the object upon which the metal is to be deposited is first thoroughly cleansed and subsequently bombarded or heated to drive off occluded air. This procedure, however, may result in too strong a bond and, in carrying the present invention into effect, it is preferable to omit those steps in the conventional process which are calculated to drive the occluded air or other gas from the surfaces upon which the metal lining is to be applied. Accordingly, referring now to Fig. 1, in applying the metallic lining to the inner surfaces of the mold it is merely necessary to place the mold, or the separate parts thereof, in an evacuable chamber 31 containing a refractory metal filament 33 and a silver (or other metal) pellet 35, and to evaporate the silver by energizing the filament. Apparently, the "layer" of occluded air adjacent to the metal surface of the cavity, and upon which the evaporated metal is deposited, ensures the required relatively low strength of adhesion.

When the device to be potted comprises an electrical unit the molding material will ordinarily be selected with a careful regard to the power factor, resistance and other electrical characteristics required. Polystyrene is commonly employed as the embedment material for electric capacitors and the present invention lends itself readily to the use of such material. Thus, when the now "metallically lined" mold, shown in the drawing, has been assembled with the capacitor armatures 23 and 25 in position on the pins 21 in the slots 19, it is merely necessary to pour or otherwise insert the monomeric styrene (or other polymerizable material) into the cavities through the top of the mold and to polymerize it in situ by any of the usual polymerizing methods. As previously brought out, the molding compound shrinks as it congeals from its plastic to its solid form and this shrinking action causes the metal lining to be stripped from the walls of the cavity (without the use of any auxiliary mechanical force) and to appear as a coating of the surface of the now polymerized, congealed or molded object. This lining or coating on the otherwise finished product may be removed, in whole or in part, if desired, by immersing or washing the casting in a solvent (say a 30% solution of nitric acid) to which the polystyrene or other embedment material is immune.

While as previously brought out, it is not necessary, nor indeed desirable, to drive off occluded gas from the metal walls of the cavity before the "plating" operation, it will be understood that the usual precautions should be taken against contaminating the mold surfaces with dirt and grease.

It will now be apparent that the present invention provides a simple and reliable method of casting or molding plastic materials and one which, in its practice, ensures a finished structure free from bubbles, cracks and other imperfections.

What is claimed is:

1. A matrix for molding material of the type which shrinks as it congeals from its plastic to its solid form, said matrix comprising a metallic structure having a smooth cavity therein, said cavity having a weakly adherent metallic silver lining which has been thermally evaporated upon the wall of said cavity by placing the matrix in an evacuable chamber and thermally evaporating a metal on the cavity wall, whereby the strength of adhesion of said metallic lining to the wall of the cavity is less than the strength of the adhesion of the molding material to the metallic lining.

2. A matrix for molding a material of the type which shrinks as it congeals from its plastic state to its solid form, said matrix comprising a metallic structure having a smooth cavity therein, said cavity having a weakly adherent metallic silver film which has been thermally evaporated on the wall of said cavity while placed in an evacuated chamber whereby the strength of adhesion of said metallic lining to the wall of the cavity is less than the strength of the adhesion of the molding material to the metallic lining.

3. A matrix for molding a material of the type which shrinks as it congeals from its plastic state to its solid form, said matrix comprising a metallic structure having a smooth cavity therein, said cavity having a weakly adherent metallic film which has been thermally evaporated on the wall of said cavity while placed in an evacuated chamber whereby the strength of adhesion of said metallic lining to the wall of the cavity is less than the strength of the adhesion of the molding material to the metallic lining.

CHARLES L. SCHEER.
WILLIS FLEISHER, Jr.

REFERENCES CITED

The following references are of record in the file of this patent:

UNITED STATES PATENTS

| Number | Name | Date |
| --- | --- | --- |
| 43,666 | Burchardt | Aug. 2, 1864 |
| 85,529 | Laughlin | Jan. 5, 1869 |
| 2,079,784 | Williams | May 11, 1937 |
| 2,166,205 | Anderson et al. | July 18, 1939 |
| 2,237,328 | Birdseye | Apr. 8, 1941 |
| 2,259,524 | Kistler | Oct. 21, 1941 |
| 2,274,444 | Freed | Feb. 24, 1942 |
| 2,313,985 | Bradshaw | Mar. 16, 1943 |
| 2,342,037 | Cremer | Feb. 15, 1944 |